United States Patent [19]

Gensheimer

[11] 4,039,873
[45] Aug. 2, 1977

[54] VIBRATION-FREE DRIVE FOR PRINTING PRESSES

[75] Inventor: Valentin Gensheimer, Muhlheim, Germany

[73] Assignee: Roland Offsetmaschinenfabrik Faber & Schleicher AG., Germany

[21] Appl. No.: 676,384

[22] Filed: Apr. 12, 1976

[30] Foreign Application Priority Data

Apr. 15, 1975   Germany .............................. 2516462

[51] Int. Cl.² ............................................. H02K 7/02
[52] U.S. Cl. .................................. 310/74; 310/75 D; 310/157
[58] Field of Search ...................... 321/47; 310/74, 75, 310/75 D, 157

[56] References Cited
U.S. PATENT DOCUMENTS 3,211,985  10/1965  Torok ................. 321/47 X
3,500,085   3/1970  Smith ................. 310/74 X
3,512,022   5/1970  Gilbert ................. 310/74
3,676,723   7/1972  Drucker ............. 310/157 X
3,819,966   6/1974  Noguchi ............... 310/74
3,987,322  10/1976  Bourgain et al. .......... 310/75 D

*Primary Examiner*—Donovan F. Duggan
*Attorney, Agent, or Firm*—Leydig, Voit, Osann, Mayer & Holt, Ltd.

[57] ABSTRACT

A drive system for a printing press having a DC drive motor which is supplied, via an inverter, from an AC supply line. A flywheel assembly is connected to at least one of the rotational elements of the press, the flywheel assembly including a flywheel and short torsionally resilient rod coaxially interconnecting the flywheel and the rotational element and rigidly connected at its ends to each of them, with the rod and the flywheel together being so proportioned as to form a resonant mechanically oscillating system having fundamental resonance at the frequency of the supply line.

3 Claims, 1 Drawing Figure

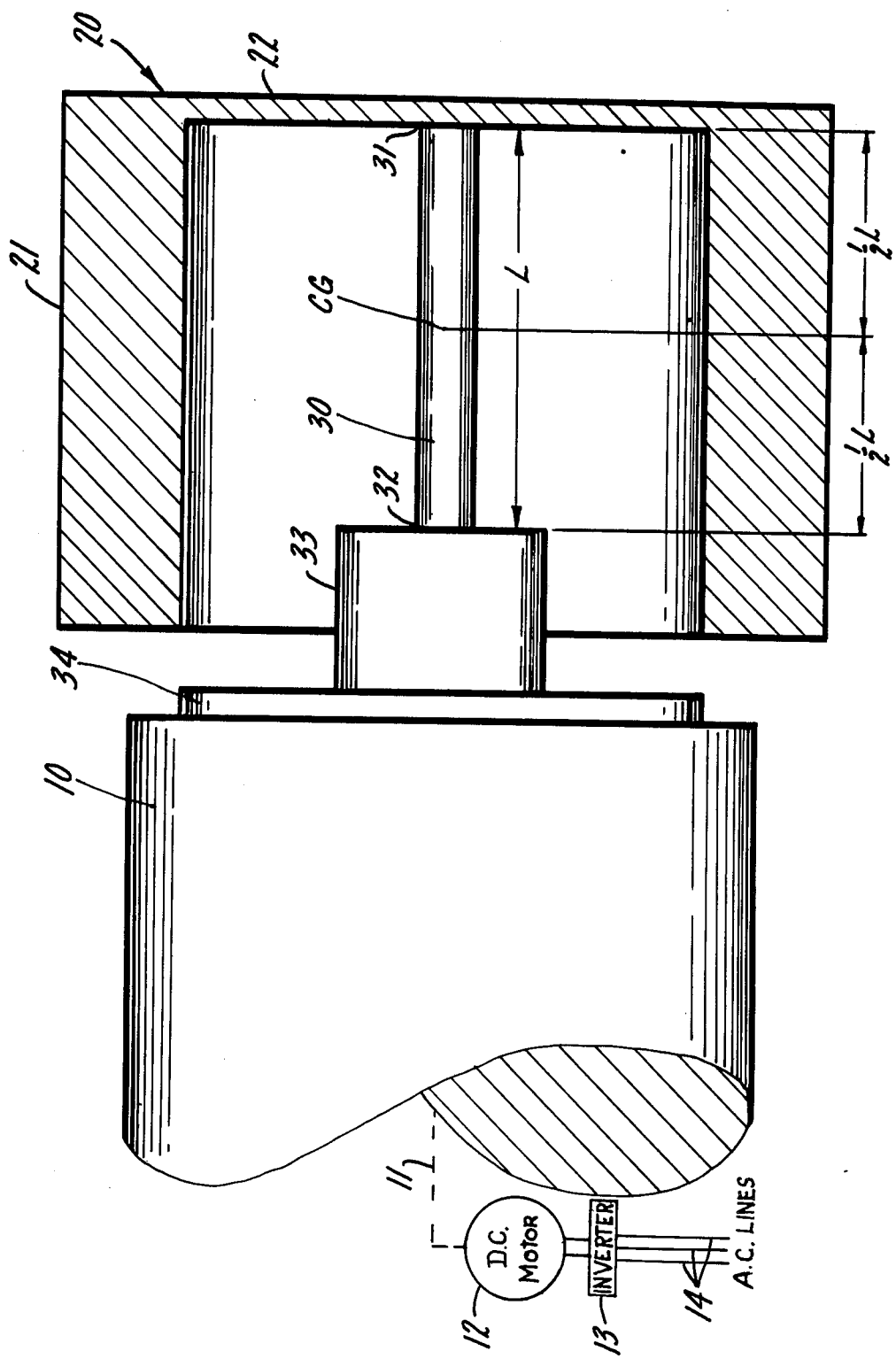

VIBRATION-FREE DRIVE FOR PRINTING PRESSES

The enemy of quality printing, particularly of the lithographic type, is vibration in the drive system showing up in the printed product, and efforts have been made over the years to reduce such vibration to a minimum. One procedure, utilizing a dampening effect, and which is disclosed in German Publication Specification 1,761,780, is the provision of bearer rings on cooperating cylinders, the rings being in pressure engagement and of slightly different diameter to produce artificial torque loading, thereby to maintain the teeth of the driving gears in continuous, unidirectional contact. It is also known to employ resilient auxiliary gears mounted upon the shafts of engaged cylinders, as taught in German Disclosure Specification 2,300,699.

These and other known vibration suppressing schemes require precise and expensive machined elements. It is found, however, that even where expensive vibration dampening mechanisms are restored to, residual vibration persists, thwarting efforts to acheive perfect printing. This is particularly true in drive systems employing a DC driving motor supplied, via an inverter, or rectifier, from AC supply lines.

It is an object of the present invention to provide a DC motor drive for printing press which enables more perfect printing, particularly in a press of the lithographic type, suppressing a vibrational component which has been found to be difficult to suppress by ordinary means.

It is a more specific object of the present invention to provide a DC motor drive for a printing press, having a motor fed by an inverter from AC supply lines, but which eliminates vibration at the frequency of the AC lines, particularly under a condition of phase unbalance.

It is a general object of the present invention to provide a DC drive system for a printing press which departs from the usual practice of absorbing energy by dampening and which, instead, employs a high "Q" mechanically resonant system which is tuned to the frequency of the vibration to be eliminated and which is of simple, highly economical construction adaptable to new designs of presses as well as existing designs of presses already in operation in the field.

Other objects and advantages of the invention will become apparent upon reading the attached detailed description and upon reference to the drawings.

The drawing shows one end of a rotational element 10 of a printing press, which rotational element may, for example, be the end of a rotatable shaft. The shaft is driven by a conventional drive connection 11 which leads to a DC motor 12. The motor is supplied with current through an inverter, or rectifier, 13 which is fed from AC supply lines 14 which may typically be three phase lines.

In accordance with the present invention, a flywheel assembly is connected coaxially to the end of the press rotational element 10, the flywheel assembly being made up of a flywheel and a short, torsionally resilient rod which coaxially interconnects the flywheel and the rotational element, the rod being rigidly connected at one end to the flywheel and at the other end to the rotational element, the rod and flywheel together being so proportioned as to form a resonant oscillating system having fundamental resonance at the frequency of the AC supply lines.

More specifically I provide a flywheel 20 which is of cup shape having a cylindrical portion, or rim, 21 integrally secured to a circular hub portion, or end wall, 22, the weight being concentrated in the rim.

Coaxially secured inside of the circular portion is a torsional rod 30 having an outer end 31 and an inner end 32. The inner end 32 is connected to a pedestal 33 which is rigidly secured to the rotational element 10 by a flange 34.

The rotational inertia of the flywheel is so tailored to the dimensions and polar modulus of elasticity of the rod 30 that the flywheel and rod form a resonant vibratory system having a frequency of resonance which corresponds to the frequency of the AC supply lines.

The amount of energy which the flywheel-rod combination is capable of absorbing and feeding back into the system per unit time is determined by the polar moment of inertia of the flywheel. This in turn is determined by the energy content of the vibration, at line frequency, which it is desired to suppress. In a typical case, it may be assumed that a flywheel is desired having a rotational inertia which is at least 1/10, say, of the moment of inertia of the rotor of the driving motor in which the vibration originates. Having preliminarily selected the moment of the flywheel, the characteristics of the rod upon which it is mounted may be tailored to the flywheel to produce mechanical resonance at the offending frequency. The rod diameter may be selected on a trial and adjustment basis, choosing a rod of a certain diameter and of slightly excess length, noting the resonance frequency of the flywheel-rod combination, and then making successive adjustments in the length of the rod as necessary to achieve the resonant condition.

In designing a system to employ the present invention, the following mathematical approach may be used. The expression for frequency F in terms of the parameters is given by:

$$F = 1/2\pi \sqrt{\pi d^4 g / 32\, I\, L},$$

where $d$ is the diameter of the rod, $G$ is the torsional (shear) modulus of elasticity, $I$ is the polar moment of inertia of the flywheel, and $L$ is the length of the rod. As stated, it will be assumed that, to produce an appreciable anti-vibrational effect, the moment of inertia $I$ may be 1/10 of that of the motor rotor in which the vibrational disturbance originates, so this value is ascertainable. The length $L$ may be chosen on the basis of convenience as an initial approximation; for example, $L$ may be assumed to be 6 inches. The line frequency is known and may, for example, be 60 cycles per second. Recasting the expression explicity in terms of $d$, it becomes:

$$d = \sqrt[4]{128\, I\, L \pi F^2 / G}$$

Substituting actual values, including an assumed length of rod of 6 inches, the expression becomes:

$$d = \sqrt[4]{0.72382 i}$$

Since $I$ is known (being fractionally related to the moment of the motor rotor), the rod diameter can be immediately determined.

All that remains, then, is to determine the rim thickness of a flywheel 6 inches in length and having a polar moment of inertia equal to $I$. Assuming the flywheel to have a thick rim and relatively thin end wall, which can be neglected, the mement of inertia is given by the expression:

$$I = \pi m L (r_1^4 - r_2^4)/2,$$

where $m$ is the mass per unit volume, $L$, is the length, $r_1$ is the outer radius and $r_2$ is the inner radius. As in selecting the length $L$ is the flywheel, the designer has certain amount of freedom in selecting the outer radius, and an outer radius of 4 inches will be assumed. It will further be assumed that the material of the flywheel is steel having a mass per unit of volume of 0.282 pound per cubic inch. Putting the expression explicitly in terms of inner diameter $r_2$ it becomes:

$$r_2 = \sqrt[4]{r_1^4 - (2 I/\pi m L)}.$$

Substituting actual values, $r_2$ can be obtained in terms of $I$ as follows:

$$r_2 = \sqrt[4]{256 - 0.376I},$$

keeping in mind that I has the assumed value. The radial thickness of the flywheel is thus determined. If the thickness is excessive, the assumed outer radius $r_1$ of the flywheel can be increased and if necessary, the length L can be increased, and the calculation can be repeated until a flywheel of practical rim thickness is achieved. The rod diameter should be confirmed as one which is great enough so as not to result in lateral bending problems within the range of speed of the press, using known formulae. It will be understood by one skilled in the art that each combination of weight plus supporting rod is capable of operating up to a certain critical rotational speed before the shaft bends and becomes unstable. In carrying out the present invention the critical speed of the flywheel-rod combination should be well above the maximum speed at which the element 10 will rotate during operation of the press.

If the calculated values are considered practical, the flywheel and rod are assembled and checked for desired resonant frequency, trimming the shaft slightly, as may be necessary, to achieve exact resonance at line frequency.

In the preferred form of the invention illustrated in the drawing, it will be noted that the flywheel is of cup shape, with a cylindrical wall, or rim, which is "folded back" over the rod.

Ideally the rod 30 and flywheel are of equal axial length so that the center of gravity CG of the flywheel occupies a position approximately midway of the rod, as illustrated in the drawing. This shortens the effective overhanging length of the rod, tending to make the rod more immune to lateral vibration, particularly when the rotating element 10 of the press operates at speed.

The vibration suppressing means described above should preferably meet the following requirements: (1) low weight; (2) high moment of inertia; (3) high bending strength of the torsion rod; (4) low dampening factor.

It is found that the system is of surprising effectiveness even where the flywheel has relatively low mass, for example, a mass which secures a rotational inertia which is only a small fractional part of the rotational inertia of the motor rotor. While the flywheel is of low mass, the mass should, as stated, be concentrated at the periphery so that it is effectively used to produce a high moment of inertia. Because of the high elastic efficiency which is inherent in the design, in other words because of the low energy loss, it is possible to achieve a worthwhile degree of suppression even where the flywheel has a moment which is substantially less than 10% of that of the motor rotor.

As to the third requirement, it can be shown that with a given torsional stiffness the bending stiffness is inversely proportional to the square of the rod length. Thus it is desirable to employ a torsion rod which is as short as possible while still utilizing a rod of reasonable diameter. The length of the rod is effectively shortened by using a flywheel of cup-shaped configuration causing the center of gravity, as stated, to fall about midway along the length of the rod.

The fourth requirement is met by employing a construction in which the rod is totally supported upon the rotating element, and secured rigidly thereto, and in which the rod is rigidly fastened at its outer end to the mounting center of the flywheel. The outer end of the rod may, for example, be welded to the center of the circular end wall 21 of the flywheel.

Experience has shown that the system is more effective in overcoming vibration at line frequency than expensive and elaborate dampening systems of the type which have been employed in the past. The system may, however, be used with a prior art dampening system and in such usage is found to be capable of removing the residual vibration which often exists even when a sophisticated dampening arrangement is employed. In other words, the present invention is capable of providing that last step of improvement which results in a substantially perfect printed product, a printed product free of any apparent vibrational effects. The present vibration removing system is particularly helpful to take care of the vibrational condition which results when the phases supplying the inverter or rectifier 13 are unbalanced.

The design of vibration-suppressor discussed above may be employed in new designs of presses and, with minimum modification and expense, in existing designs of presses as well, even presses which are already in operation in the field. The cost of construction and installation is minimal because of the extreme simplicity of the design. And, because of the fact that the system has an inherently high "Q", damping is minimized, so that the energy which is absorbed during one portion of the cycle is immediately fed back, in equal amount, to the system. Thus there is no need whatsoever for means for dissipating heat energy which is a normal requirement in conventional systems of the dampening type.

If desired, the resonant system may be axially mounted directly on the motor shaft, in which case the shaft will be the "rotational element" called for herein.

I claim:

1. In a drive system for a printing press having cylinders and intended for powering from an a.c. supply line, the combination comprising a d.c. drive motor mechanically coupled to the cylinders to form a system of rotational elements, an inverter interposed between the supply line and the motor, and a flywheel assembly connected to one of the rotational elements, the flywheel assembly including a cup-shaped flywheel having a cylindrical portion and an end wall, a torsionally resilient rod axially centered in the flywheel, the rod being connected rigidly at its first end to the end wall and coaxially connected at its second end to the associated rotational element, the rod and flywheel together being so proportioned as to form a resonant oscillating system having fundamental resonance at the frequency of the supply line, the axial length of the rod being approximately equal to the axial length of the flywheel so that the rod is substantially totally self-contained within the flywheel.

2. The combination as claimed in claim 1 in which the torsionally resilient rod is supported cantilever-fashion on the associated rotational element and is sufficiently stiff in its bending moment as to have a high degree of stability against bending at the maximum speed of the rotational element.

3. The combination as claimed in claim 2 in which the flywheel has a rotational inertia which is at least one-tenth of the rotational inertia of the rotor of the drive motor.

* * * * *